(12) United States Patent
Barr et al.

(10) Patent No.: US 11,701,970 B2
(45) Date of Patent: Jul. 18, 2023

(54) SYSTEMS AND METHODS FOR CONTROLLED TRAVERSAL OF PHASE BREAKS

(71) Applicant: Westinghouse Air Brake Technologies Corporation, Wilmerding, PA (US)

(72) Inventors: Stuart Barr, Cedar Rapids, IA (US); Karen A. Shaw, Cedar Rapids, IA (US); Keith Smith, Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 699 days.

(21) Appl. No.: 16/723,648

(22) Filed: Dec. 20, 2019

(65) Prior Publication Data

US 2021/0188224 A1 Jun. 24, 2021

(51) Int. Cl.
*B60L 9/00* (2019.01)
*B60L 13/00* (2006.01)
*B60L 3/04* (2006.01)
*B60L 5/38* (2006.01)
*B60M 1/18* (2006.01)
*B60L 15/20* (2006.01)
*B60L 7/22* (2006.01)
(Continued)

(52) U.S. Cl.
CPC ........ *B60L 9/00* (2013.01); *B60L 3/04* (2013.01); *B60L 5/38* (2013.01); *B60L 7/22* (2013.01); *B60L 13/006* (2013.01); *B60L 15/20* (2013.01); *B60M 1/18* (2013.01); *B60L 9/08* (2013.01); *B60L 9/24* (2013.01); *B60L 50/15* (2019.02); *B60L 50/53* (2019.02); *B60L 2200/26* (2013.01); *B60L 2240/62* (2013.01); *B60L 2240/70* (2013.01); *B60T 2210/36* (2013.01)

(58) Field of Classification Search
CPC ........ B60L 3/04; B60L 5/38; B60L 9/00; B60L 9/08; B60L 9/24; B60L 2240/62; B60L 2240/70; B60L 7/22; B60L 50/15; B60L 50/53; B60L 50/20; B60T 2210/36; B60M 1/18
USPC ........................................ 191/6, 8, 33 R, 39
See application file for complete search history.

(56) References Cited

U.S. PATENT DOCUMENTS 4,301,899 A * 11/1981 McSparran ............... B61L 1/12
                                                        104/298
7,162,337 B2 * 1/2007 Peltz ........................ B60L 9/00
                                                        701/19

(Continued)

*Primary Examiner* — Zachary L Kuhfuss
(74) *Attorney, Agent, or Firm* — The Small Patent Law Group LLC; Christopher R. Carroll

(57) ABSTRACT

A system includes a phase break input unit, one or more vehicle location detectors, and one or more processors. The phase break input unit is configured to obtain phase break location information indicating a location of a phase break along a route to be traversed by a vehicle. The one or more vehicle location detectors are configured to obtain vehicle location information indicating at least one of location of the vehicle or movement of the vehicle. The one or more processors are configured to determine an estimated arrival time of the vehicle at the phase break using the phase brake location information and the vehicle location information, and send a phase break control signal to a control system of the vehicle responsive to the estimated arrival time satisfying a threshold.

20 Claims, 3 Drawing Sheets

(51) Int. Cl.
  *B60L 9/08*  (2006.01)
  *B60L 9/24*  (2006.01)
  *B60L 50/15*  (2019.01)
  *B60L 50/53*  (2019.01)

(56) References Cited

U.S. PATENT DOCUMENTS

| | | | | |
|---|---|---|---|---|
| 7,340,329 B2 * | 3/2008 | Marra | ........................ | B60L 5/00 |
| | | | | 701/19 |
| 9,260,014 B2 * | 2/2016 | Fujimoto | ................. | B61L 23/00 |
| 9,713,966 B2 * | 7/2017 | Barlini | ................... | B61C 17/06 |
| 2002/0174798 A1 * | 11/2002 | Kumar | ................... | B60L 50/16 |
| | | | | 105/50 |
| 2016/0304000 A1 * | 10/2016 | Barlini | ................... | B61C 17/06 |

* cited by examiner

SYSTEMS AND METHODS FOR CONTROLLED TRAVERSAL OF PHASE BREAKS

BACKGROUND

Technical Field

The subject matter described relates to systems and methods that control movements of vehicles.

Discussion of Art

Certain vehicles travel along routes and receive power from sources (e.g., catenary lines) disposed along the route. Practical limitations on the length of such sources may require a vehicle to switch from one source of power to another (e.g., from a first catenary source to a second catenary source). However, the sources of power may be at different phases and/or voltage levels, with an interruption in the power supply interposed between the sources, requiring the vehicle to disconnect from the power source while traversing the interruption in the power supply. Various activities may be performed to prepare the vehicle for traversing the interruption. However, current approaches, for example, may not provide operators with a desired amount of information regarding upcoming interruptions in power.

BRIEF DESCRIPTION

In one embodiment, a system includes a phase break input unit, one or more vehicle location detectors, and one or more processors. The phase break input unit is configured to obtain phase break location information indicating a location of a phase break along a route to be traversed by a vehicle. The phase break location information is obtained before the vehicle arrives at the phase break. The one or more vehicle location detectors are configured to obtain vehicle location information indicating at least one of location of the vehicle or movement of the vehicle. The one or more processors are configured to determine an estimated arrival time of the vehicle at the phase break using the phase brake location information and the vehicle location information, and send a phase break control signal to a control system of the vehicle responsive to the estimated arrival time satisfying a threshold.

In one embodiment, a method includes obtaining phase break location information indicating a location of a phase break along a route to be traversed by a vehicle, wherein the phase break location information is obtained before the vehicle arrives at the phase break. The method also includes obtaining, via one or more vehicle location detectors, vehicle location information indicating at least one of location of the vehicle or movement of the vehicle. Further, the method includes determining an estimated arrival time of the vehicle at the phase break using the phase brake location information and the vehicle location information. Also, the method includes sending a phase break control signal to a control system of the vehicle responsive to the estimated arrival time satisfying a threshold.

In one embodiment, a tangible and non-transitory computer readable media is configured to control one or more processors to obtain phase break location information indicating a location of a phase break along a route to be traversed by a vehicle, wherein the phase break location information is obtained before the vehicle arrives at the phase break; obtain, via one or more vehicle location detectors, vehicle location information indicating at least one of location of the vehicle or movement of the vehicle; and determine an estimated arrival time of the vehicle at the phase break using the phase brake location information and the vehicle location information; and send a phase break control signal to a control system of the vehicle responsive to the estimated arrival time satisfying a threshold.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods that determine when a vehicle will approach a phase break (e.g., within a predetermined distance or time), and provide prompts and/or control signals to the vehicle. As used herein, a phase break may be understood as an electrically isolated section of route (e.g., an overhead power cable or electrified rail) used to power vehicles (e.g., vehicles using a sliding pantograph) touching the portion of the route (e.g., overhead power cable), with the phase break used to separate two sections (e.g. sections of catenary) with different phases and/or voltage. For example, various systems and/or methods disclosed herein control a signal output to a vehicle to indicate when the vehicle is entering and leaving a phase break. In some embodiments, the phase break location is identified as single location in the center of the phase break (e.g., from a track database such as a positive train control track database). While some embodiments utilize an AC overhead cable or catenary, it may be noted that other embodiments may utilize a different source of power, such as a DC system providing power through a $3^{rd}$ rail, or through $3^{rd}$ and $4^{th}$ rails (e.g., power and return rails). While DC systems do not have phase change issues that may be present in AC systems, there are still breaks along routes for such DC systems to accommodate relatively frequent substations to address power loss in such systems.

It may be noted that while example embodiments may be discussed in connection with rail vehicle systems, that not all embodiments described herein are limited to rail vehicle systems and/or positive train control systems. For example, one or more embodiments of the systems and methods described herein can be used in connection with other types of vehicles receiving power as they travel along a route, such as automobiles, trucks, buses, mining vehicles, marine vessels, or the like. The systems and methods, for example, can notify these other types of vehicles of upcoming breaks or disturbances in power supplies.

Figure 1:
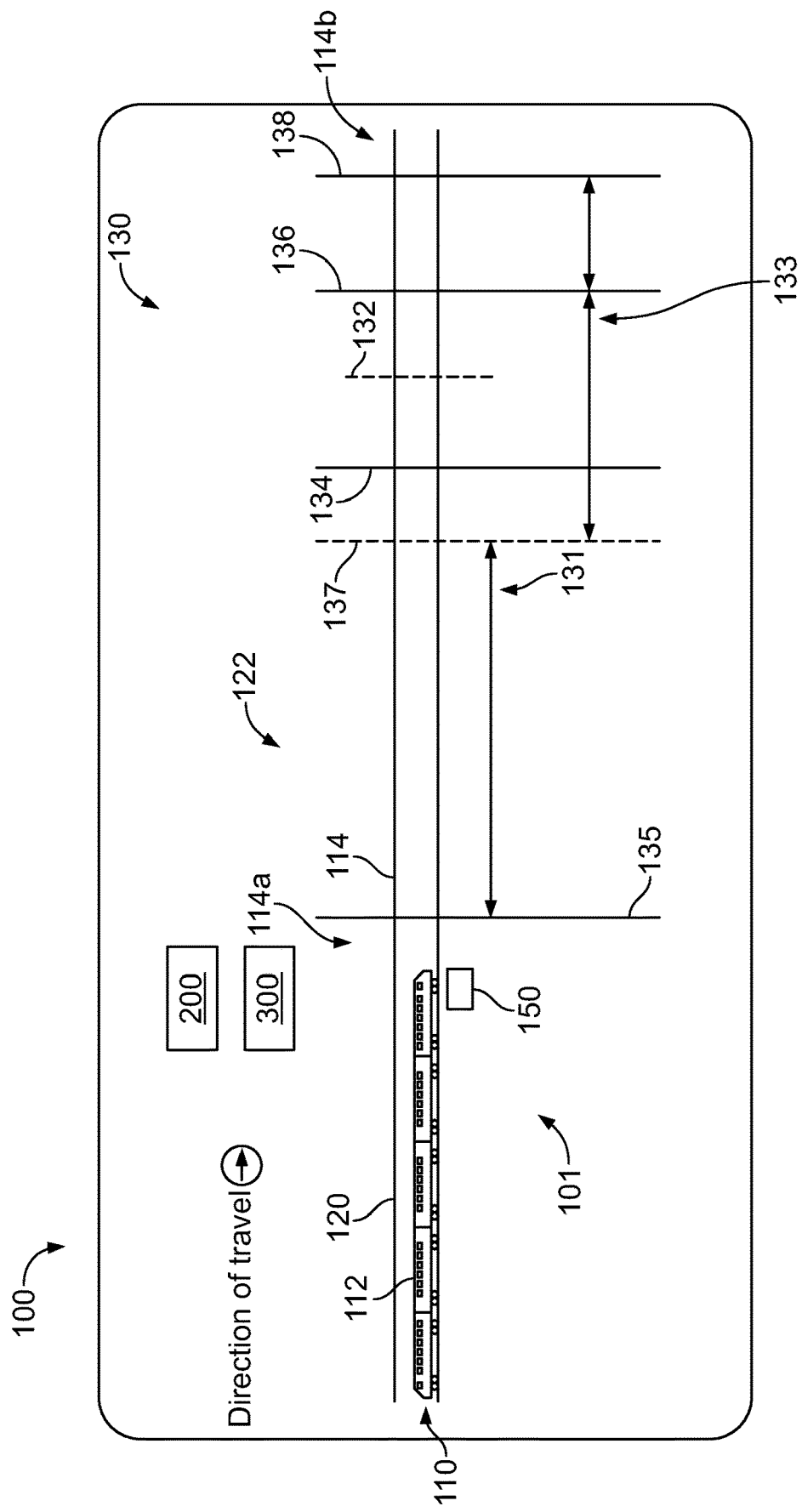
FIG. 1 illustrates one example of a network including a phase break.

FIG. 1 illustrates an example network 100 that includes a vehicle 110, an office system 200, and a system 300. Generally the vehicle 110 traverses a route 101 of the network 100, and receives power from a catenary wire 114 via a pantograph 112. A phase break 130 is disposed along the route 101 along a path to be traversed by the vehicle 110. It may be noted that a single vehicle 110 is shown traversing a single route 101 of the network 100 in FIG. 1 for ease and clarity of illustration, however multiple vehicles may traverse multiple routes of the network 100. The office system 200 is located off-board the vehicle 110 and is configured to provide information and/or commands to the vehicle 110 (as well as other vehicles) traversing various routes of the network. The system 300 is configured to help control the vehicle 110 as the vehicle 110 approaches the phase break 130. It may be noted that the system 300 may be disposed on-board the vehicle 110 in some embodiments, and off-board the vehicle 110 in other embodiments. Further, in some embodiments, some aspects of the system 300 may be disposed on-board the vehicle 110 while other aspects are disposed off-board the vehicle 110.

Generally, as used herein, a catenary may be understood as a power cable that is strung over tracks to provide power to a vehicle, such as a train, through a pantograph (e.g., pantograph 112). A pantograph as used herein may be understood as an apparatus attached to a vehicle (e.g., to the roof of a train car or locomotive) to reach the catenary line and draw current from the catenary line.

It may be noted that as the vehicle 110 traverses the route 101, there are practical limitations on the length of a given section of catenary line. Accordingly, the vehicle 110 may travel past the range of a first catenary section and into the range of a second catenary section from which the vehicle 110 will receive power. However, adjacent catenary sections may provide power at different phases. Accordingly, a phase break may be placed between the sections to isolate the sections at different phases from each other. In the illustrated example, the phase break 130 is disposed between a first catenary wire section 114a and a second catenary wire section 114b, with the first catenary wire section 114a associated with a first power source, and the secondary catenary wire section 114b associated with a second power source that provides power at a different phase and/or voltage from the first power source. The isolated section, for example, may be run to ground.

Figure 2:
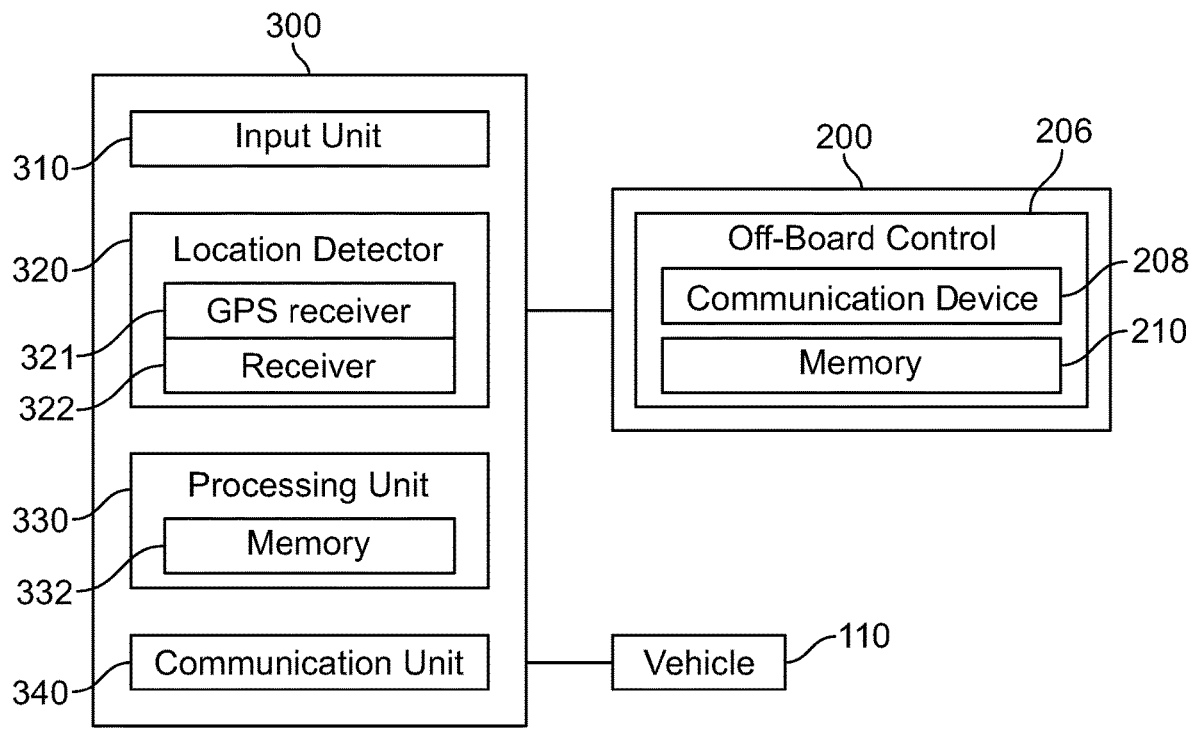
FIG. 2 provides a schematic block diagram of example aspects of the network of FIG. 1.

FIG. 2 provides a schematic block diagram of aspects of the network 100 according to various embodiments. As seen in FIG. 2, the depicted system 300 includes a phase break input unit 310, a location detector 320, and a processing unit 330. Generally, the system 300 determines when the vehicle 110 is approaching the phase break 130, and causes or helps cause the initiation of various control activities to be performed on or by the vehicle 110 in preparation for traversing the phase break 130. Generally, the system 300 acquires information regarding the location of the vehicle 110 and the phase break 130 relative to each other, and determines when it is appropriate to begin preparation of the vehicle 110 for the phase break 130.

The system 300 in the example embodiment is configured to communicate with the office system 200. The office system 200 in various embodiments may include on off-board control system 206, which may be referred to as a vehicle management control system or an off-board control system as the system 200 (and control system 206) is off-board the vehicle 110. The off-board control system 206 can represent hardware circuitry that includes and/or is connected with one or more processors that perform the operations of the off-board control system. The off-board control system 206 can include or be connected with a communication device 208 that is configured to communicate with the system 300 and/or the vehicle 110.

The off-board control system 206 in various embodiments can be, include, or be a part of a back-office server of a positive train control system. Alternatively, the off-board control system 206 can be another system that monitors movements of the vehicles to ensure safe travel of the vehicles. For example, the off-board control system 206 can be configured as, form a part of, or be associated with a dispatch facility, a scheduling facility, or the like. The off-board control system 206 can include a tangible and non-transitory computer-readable storage medium (e.g., a memory 210) that stores locations of the phase breaks, and/or other information.

The phase break input 310 is configured to obtain phase break location information. The phase break input 310 may include one or more components configured to receive a manual input providing the phase break location (e.g., keyboard, scanner, or the like), and/or include one or more components configured to receive communication signals including the phase break location (e.g., wireless receiver). The phase break location information indicates location of a phase break (e.g., phase break 130) along a route (e.g., route 101) to be traversed by the vehicle 110. It may be noted that the phase break information is obtained before the vehicle 110 arrives at the phase break 130, with the phase break information utilized to help prepare the vehicle 110 for traversing the phase break 130. It may be noted that the phase break location information may include information regarding plural phase breaks to be encountered by the vehicle 110, of which phase break 130 provides an example. The phase break information in various embodiments is provided from information that is predetermined or known ahead of time. For example, each phase break along a given length or section of track may be stored in a database and/or as locations along a map (e.g., by system 200) which are provided via the phase break input 110 before the vehicle approaches the phase break 130. In various embodiments, the phase break input information may be provided autonomously or automatically. For example, the vehicle 110 may traverse through different territories (e.g., different territories of a positive train control system), with each territory having a given number of phase breaks at known locations disposed within the territory. As the vehicle 110 enters a given territory, the phase break information may be acquired via the phase break input 310. For example, responsive to a change in territory by the vehicle 110, the phase break input unit 310 may obtain the phase break location information from the office system 200 or other office system disposed off-board of the vehicle 110. In various embodiments, the phase break input unit 310 may be configured (e.g., programmed or instructed) to obtain locations of phase breaks within a given territory when the vehicle 110 enters that particular territory. Once obtained, the phase break information may be stored (e.g., in memory 332) and used by the system 300 as discussed herein.

The location detector 320 is configured to obtain vehicle location information. The vehicle location information indicates at least one of a location of the vehicle 110 or the movement of the vehicle 110. Vehicle location information in various embodiments includes, for example, one or more of geographical location of the vehicle 110, identification of track on which the vehicle 110 is disposed (or will be disposed), identification of switch position for a switch that has been encountered or will be encountered by the vehicle 110, or speed of the vehicle 110. It may be noted that one or more location detectors 320 may be utilized in various embodiments, and that location detector(s) 320 may be disposed on-board and/or off-board the vehicle 110. For example, a speedometer disposed on-board the vehicle 110 may be used to determine a speed of the vehicle 110. As another example, the location detector 320 in various embodiments includes one or more sensors located on-board the vehicle 110 and configured to utilize signals from a satellite such as a global positioning system (GPS) or other satellite positioning system. In some embodiments, the location detector 320 includes a GPS receiver 321 disposed on-board the vehicle 110. As another example, the location detector 320 may include a receiver 322 that is configured to receive switch information from a wayside device 150 that is disposed along the route 101. (See also FIG. 1.)

The depicted processing unit 330 is operably coupled to the phase break input unit 310 and the location detector 320 and is configured to acquire information from the phase break input unit 310 and the location detector 320. It may be noted that, for ease and clarity of illustration, in the depicted example, processing unit 330 is shown as a single unit; however, in various embodiments the processing unit 330 may be distributed among or include more than one physical unit, and may be understood as representing one or more processors. The processing unit 330 represents hardware circuitry that includes and/or is connected with one or more processors (e.g., one or more microprocessors, integrated circuits, microcontrollers, field programmable gate arrays, etc.) that perform operations described herein. The processing unit 330 in various embodiments stores acquired information in a tangible and non-transitory computer-readable storage medium (e.g., memory 332). Additionally or alternatively, instructions for causing the processing unit 330 to perform one or more tasks discussed herein may be stored in a tangible and non-transitory computer-readable storage medium (e.g., memory 332 in FIG. 2).

In the illustrated example, the processing unit 330 is configured to obtain the phase break location information (e.g., via phase break input unit 310), and to obtain the vehicle location information (e.g., via one or more location detectors 320). Then the processing unit 330 determines an estimated arrival time of the vehicle 110 at the phase break 130 using the phase brake location information and the vehicle location information. For example, the processing unit 330 may use a location of the vehicle that is estimated or measured using the vehicle location information, a speed of the vehicle that is estimated or measured using the vehicle location information, and a known location of the phase break 130 from the phase break information to determine a distance between the vehicle 110 and the phase break 130, as well as the rate at which the vehicle 110 is approaching the phase break 130. For a territory with multiple phase breaks, the processing unit 330 may identify a particular phase break as the next phase break to be encountered by the vehicle and use that particular phase break's location in determining the estimated time of arrival. The speed of the vehicle 110, for example, may be determined using multiple determined positions over a known change in time, or as another example, a speedometer disposed on-board the vehicle.

With the estimated time of arrival determined, the depicted processing unit 330 next sends a phase break control signal to a control system (e.g., control system 404 shown in FIG. 4) of the vehicle 110 responsive to the estimated arrival time satisfying a threshold. For example, the threshold may be a predetermined amount of time apportioned for performing activities to prepare the vehicle 110 for arrival at the phase break 130 and/or traversal of the phase break 130. The threshold may also include a buffer time amount to provide a safety factor for performance of the activities. As the vehicle 110 travels along the route, the processing unit 330 in various embodiments periodically determines the current position of the vehicle 110 with respect to the phase break 130 along with the speed of the vehicle 110, determines a current or updated estimated time of arrival, and compares the most recent estimated time of arrival with the threshold. When the threshold is satisfied (e.g., the estimated time of arrival is equal to or less than the threshold), the phase break control signal is sent. For example, the state of one or more control signals may be altered responsive to satisfaction of the threshold.

In some embodiments, the phase break control signal is configured to provide an alert to an operator of the vehicle 110. For example, the phase break control signal may cause a prompt to appear on a display of the vehicle 110, and may include a list of activities to be performed by the operator to prepare for the phase break 130. The prompt may provide a message indicating the approaching phase break location. Alternatively, the prompt may provide a message when a leading edge of the vehicle 110 arrives a set distance before the phase break 130. Additionally, or alternatively, the control signal may be configured to autonomously control the vehicle 110 to perform one or more phase break preparation activities. For example, if the operator has not responded to a previous prompt or it is otherwise determined that phase break preparation should begin, the processing unit 330 may send a control signal to the vehicle 110 causing autonomous performance of one or more phase break activities. In various embodiments, when the state of the control signal is changed, the control signal may cause the vehicle to take one or more actions (e.g., open catenary circuit breaker, drop the pantograph from the catenary to remove power, engage dynamic braking as a temporary power source, decrease or otherwise change vehicle speed, etc.) in preparation for arriving and departing the phase break location.

Generally, phase break activities may be understood as those activities to be performed before the vehicle 110 encounters the phase break 130. For example, in various embodiments, phase break preparation activities include placing the vehicle 110 in neutral, opening a catenary circuit breaker, stopping the provision of power from the catenary to vehicle 110 (e.g., by disengaging the pantograph from the catenary), engaging dynamic breaking (e.g., to provide temporary power), and so on. Different activities may be performed at various distances from the phase break in a designated sequence. Accordingly, plural control signals or states of a control signal may be utilized. Further, after passing the phase break 130, additional steps may be taken (e.g., displaying that the phase break 130 has been passed, raising the pantograph 112 to engage the catenary 114 of the second catenary portion 114*b*, etc.).

With reference to FIG. 1, it may be noted that various activities may be performed based on location of the vehicle 110 with respect to the phase break 130. In the illustrated example, for instance, various boundaries with respect to the phase break 130 are illustrated: an entry boundary 135, a signal point 137, a phase break beginning 134, a phase break center 130, a phase break end 136, and an exit boundary 138. In the illustrated embodiment, as the vehicle 110 (e.g., a leading edge of the vehicle 110) passes the entry boundary 135 (e.g., based on the estimated arrival time), a phase break information prompt is displayed to an operator of the vehicle 110 responsive to a control signal from the system 300. In the depicted example, the prompt is displayed until the signal point 137 at which point a control signal is driven to a high state, with a power cut out prompt displayed. If the prompt does not result in the cut out of power and/or other appropriate phase break preparation activities occurring, the system 300 may send a control signal causing the autonomous performance of one or more phase break preparation activities (e.g., placing vehicle 110 in neutral, lower pantograph 112 to disengage from the first catenary wire portion 114a). The prompt showing power cut out is continued to be displayed in the illustrated example as the vehicle 110 passes the phase break beginning 134 and phase break center 130 (where the signal may be released) until the vehicle reaches or passes the phase break end 136, at which point a prompt showing the restoration of power is displayed. Again, if power is not restored within a desired time of passing the phase break 130, the system 300 may send one or more control signals to restore power (e.g., raise the pantograph 112 to engage the second catenary wire portion 114b). Once the vehicle 110 is past the exit boundary 138, the system 300 may analyze the phase break location information to identify any additional upcoming phase breaks, and determine an estimated arrival time at the next phase break.

The depicted system 300 also includes a communication device 340. Generally, the communication device 340 includes one or more components (e.g., receiver, transceiver) configured to communicate or obtain information from off-board sources such as the office system 200 or wayside device 150. It may be noted that the communication device 340 is shown as a single distinct block for ease of illustration. However, in various embodiments the communication device 340 may work with or form a part of aspects of the system 300 (or be formed from one or more aspects of system 300), such as the phase break input unit 310. For example, in various embodiments, the communication device 340 receives the phase break input location from the office system 200 and provides the phase break location to the processing unit 120. Further, in some embodiments, the system 300 may communicate with one or more off-board systems (e.g., office systems) to inform appropriate office systems when the vehicle 110 enters a territory associated with a particular office system, to obtain phase break information from the appropriate office system. Additionally or alternatively, the communication unit 340 may work with or form a part of receiver 322 for receiving location information (e.g., from wayside device 150). Accordingly, in various embodiments, one or more aspects of the receiver 322 and/or phase break input unit 310 may be incorporated into or cooperate with the communication device 340. Further, the communication unit 340 may also be utilized to communicate with the vehicle 110 (e.g., in embodiments where the system 300 or aspects thereof are disposed off-board the vehicle 110). For example, the system 300 may send control signals as discussed herein to the vehicle 110 via the communication unit 340.

Figure 3:
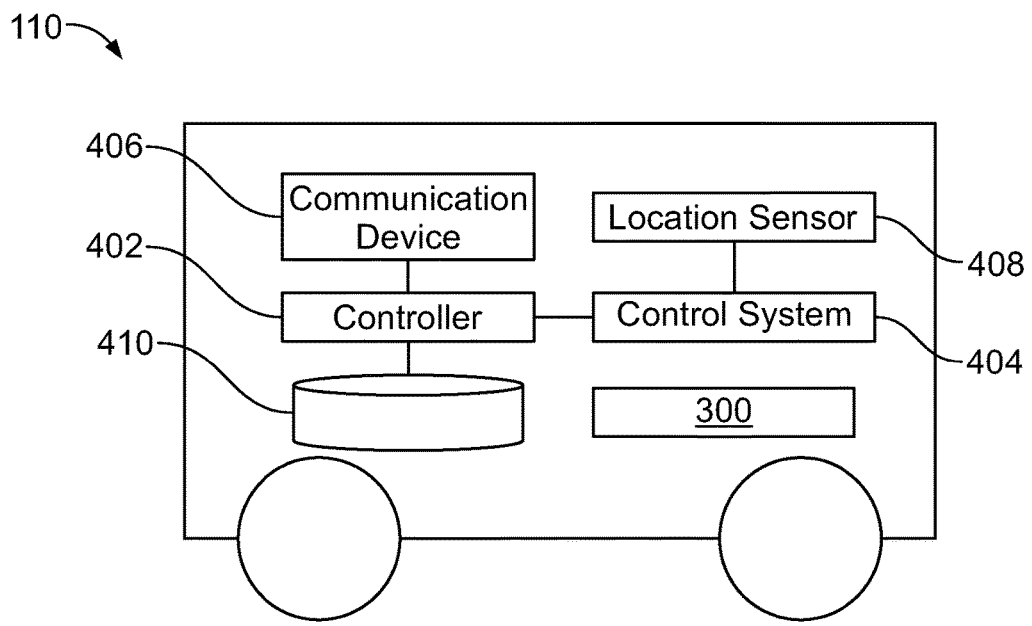
FIG. 3 provides a schematic block diagram of aspects of the network of FIG. 1 disposed on a vehicle.

It may be noted that, in various embodiments, the system 300 (or aspects thereof) is configured to be disposed on the vehicle 110. For example, in some embodiments, the phase break unit 310 and the location detector 320 are configured to be disposed on the vehicle. FIG. 3 illustrates an example embodiment in which the phase break input unit 310 and location detector 320 are disposed on the vehicle 110. In the illustrated example, the entire system 300 is disposed on the vehicle 110.

As seen in FIG. 3, the vehicle 110 includes a controller 402 that represents one or more processors that control movement and other operations of the vehicle. This controller can be referred to as a vehicle controller. The vehicle controller can represent an engine control unit, an onboard navigation system, or the like, that can control a propulsion system (e.g., one or more engines, motors, etc.) and/or a braking system (e.g., one or more friction brakes, air brakes, regenerative brakes, etc.) to control movement of the vehicle.

The vehicle optionally includes a control system 404 that communicates with the system 300 for receiving control signals (e.g., signal sent or states of signals changed responsive to satisfaction of a threshold for arrival at an upcoming phase break). The control signals can be received by the vehicle controller and/or vehicle control system via a communication device 406. This communication device (as well as other communication units discussed herein) can include an antenna and wireless transceiving circuitry that wirelessly communicates signals with other communication devices described herein. A tangible and non-transitory computer-readable storage medium (e.g., a memory 410) of the vehicle may store acquired information (e.g., phase break locations, vehicle locations) and/or instructions for causing performance of one or more tasks by the controller 402. The depicted vehicle 110 includes a location sensor 408 that determines locations and/or headings of the vehicles. The location sensor can represent a global positioning system receiver, a wireless triangulation system, a dead reckoning system, inertial sensors, or the like, that determines locations and/or headings of the vehicle 110. The locations and/or headings of the vehicles can be determined by the location sensors and communicated to the system 300 (e.g., to provide the location information). It may be noted that one or more aspects of the vehicle 110 and system 300 may be shared, such as communication devices for communicating with the off-board office system 200, or, as another example, location sensor 408 may provide an example of the location detector 320 in various embodiments.

Figure 4:
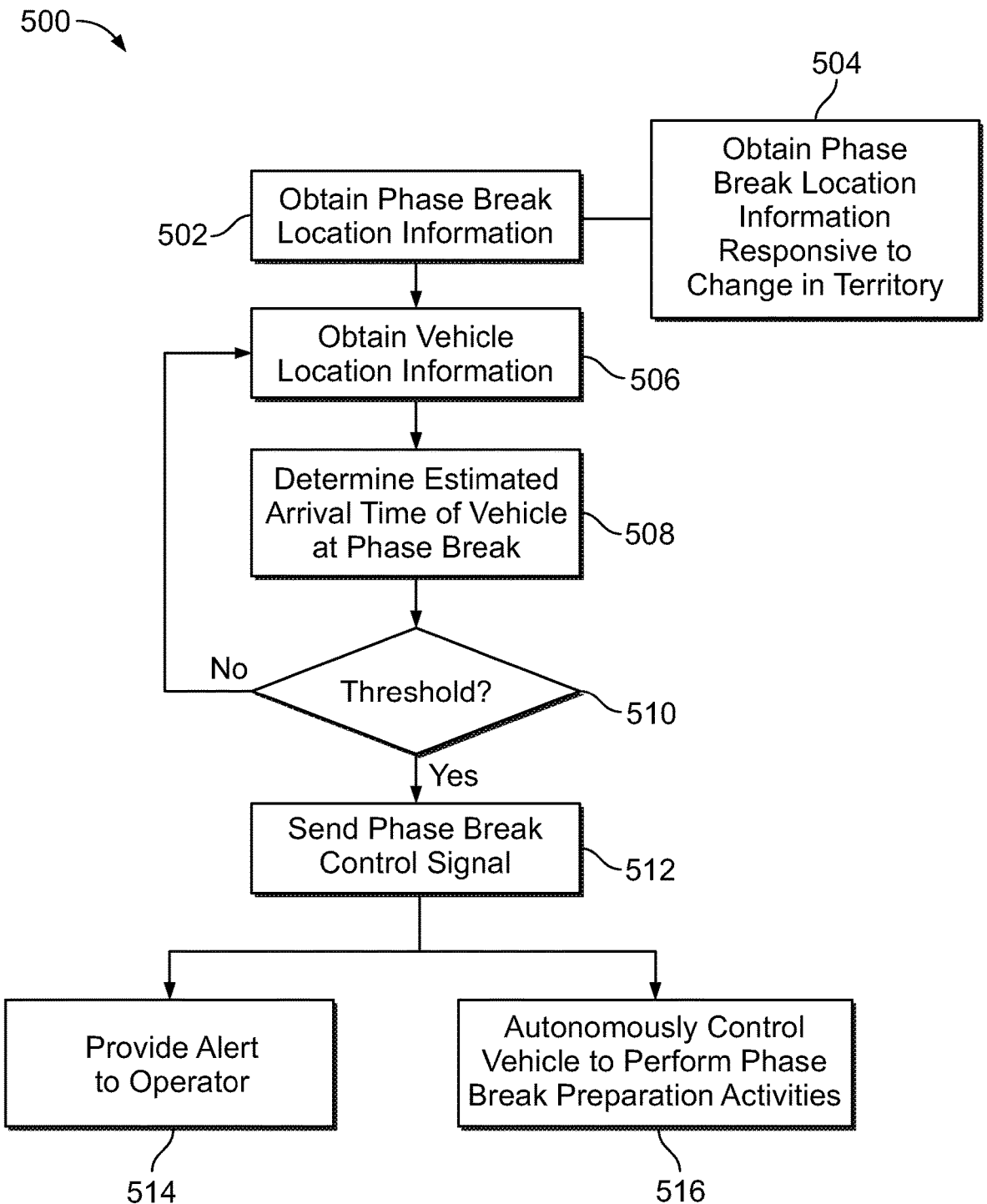
FIG. 4 illustrates a flowchart of one example of a method for controlling a vehicle traversing a route including a phase break.

FIG. 4 illustrates a flowchart of one example of a method 500 for controlling a vehicle traversing a route having one or more phase breaks. The method 500, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 500 may be able to be used as one or more algorithms to direct hardware (e.g., one or more aspects of the processing unit 330) to perform one or more operations described herein.

At 502, phase break location information is obtained. The phase break location information indicates a location of a phase break (e.g., phase break 130) along a route to be traversed by a vehicle (e.g., vehicle 110). The phase break location is obtained before the vehicle arrives at the phase break. For example, the phase break location may be obtained when the vehicle enters a territory having one or more phase breaks. In the illustrated example, at 504, the phase brake location information is obtained from an office system (e.g., a dispatching system, or a back office system, for example, for positive train control) that is disposed off-board the vehicle responsive to a change in territory of the vehicle.

At 506, vehicle location information is obtained. For example, the vehicle location information may be obtained via one or more vehicle location detectors. In some embodiments, the location information includes information obtained via a GPS receiver. For example, locations of the vehicle may be detected at different times as the vehicle moves, and the method may include estimating the speed of the vehicle using the locations that were detected at different times. Alternatively or additionally, obtaining the location information in various embodiments includes receiving switch information from a wayside device that is disposed along the route, and determining the location of the vehicle using the switch information. The vehicle location information indicates at least one of location of the vehicle or movement of the vehicle. For example, the vehicle location information may include a geographic position of the vehicle, a speed of the vehicle, and/or information identifying a track or other route on which the vehicle is disposed.

At 508, an estimated arrival time of the vehicle at the phase break is determined. The estimated arrival time is determined using the phase brake location information and the vehicle location information. For example, a distance between the phase break and the vehicle may be determined, and an estimated speed of the vehicle used to estimate the time for traversing the determined distance.

At 510, it is determined if the estimated arrival time satisfies a threshold (e.g., is equal to or less a predetermined amount of time corresponding to the time required to perform phase break preparation activities). For example, the threshold may be set to provide an operator or crew with sufficient time to perform phase break preparation activities along with an amount of additional time. If it is determined at 510 that the threshold is not satisfied, the depicted method 500 returns to 506 to update vehicle location information. If it is determined at 510 that the threshold is satisfied, then, at 512, a phase break control signal is sent to a control system of the vehicle responsive to the estimated arrival time satisfying the threshold. For example, the state of a control signal sent to the vehicle may change. The phase break control signal may cause a prompt to be displayed to one or more operators of the vehicle, and/or cause a control action to be performed on or by the vehicle.

For example, at 514, the control signal is received on-board the vehicle, and an alert is provided to an operator of the vehicle responsive to receiving the control signal. The alert, for example, may provide a notification of an upcoming phase break, and/or list phase break preparation activities to be performed.

As another example, at 516, the control signal is received on-board the vehicle, and the vehicle is autonomously controlled to perform one or more phase break preparation activities responsive to receiving the control signal. For example, if a predetermined time after a prompt to perform a required phase break preparation activity (or activities) has expired and the activities not performed, the activity (or activities) may be autonomously performed by a control system of the vehicle responsive to receiving a control signal sent at 512.

In one embodiment, a system includes a phase break input unit, one or more vehicle location detectors, and one or more processors. The phase break input unit is configured to obtain phase break location information indicating a location of a phase break along a route to be traversed by a vehicle. The phase break location information is obtained before the vehicle arrives at the phase break. The one or more vehicle location detectors are configured to obtain vehicle location information indicating at least one of location of the vehicle or movement of the vehicle. The one or more processors are configured to determine an estimated arrival time of the vehicle at the phase break using the phase brake location information and the vehicle location information, and send a phase break control signal to a control system of the vehicle responsive to the estimated arrival time satisfying a threshold.

Optionally, the phase break input unit and the one or more vehicle location detectors are configured to be disposed on the vehicle. For example, in some embodiments, the phase break input unit obtains the phase break location information from an office system disposed off-board the vehicle responsive to a change in territory of the vehicle.

Optionally, the one or more vehicle location detectors include a global positioning system (GPS) receiver.

Optionally, the one or more vehicle location detectors include a receiver configured to receive switch information from a wayside device disposed along the route.

Optionally, the control signal is configured to provide an alert to an operator of the vehicle. Alternatively or additionally, in various embodiments the control signal is configured to autonomously control the vehicle to perform one or more phase break preparation activities.

In one embodiment, a method includes obtaining phase break location information indicating a location of a phase break along a route to be traversed by a vehicle, wherein the phase break location information is obtained before the vehicle arrives at the phase break. The method also includes obtaining, via one or more vehicle location detectors, vehicle location information indicating at least one of location of the vehicle or movement of the vehicle. Further, the method includes determining an estimated arrival time of the vehicle at the phase break using the phase brake location information and the vehicle location information. Also, the method includes sending a phase break control signal to a control system of the vehicle responsive to the estimated arrival time satisfying a threshold.

Optionally, the method includes obtaining the phase break location information from an office system disposed off-board the vehicle responsive to a change in territory of the vehicle.

Optionally, the method includes obtaining the location information via a global positioning system (GPS) receiver. For example, in some embodiments, the method includes detecting locations of the vehicle at different times, and estimating a speed of the vehicle using the locations detected at different times.

Optionally, the method includes receiving switch information from a wayside device disposed along the route, and determining the location of the vehicle using the switch information.

Optionally, the method includes receiving the control signal on-board the vehicle, and providing an alert to an operator of the vehicle responsive to receiving the control signal.

Optionally, the method includes receiving the control signal on-board the vehicle, and autonomously controlling the vehicle to perform one or more phase break preparation activities responsive to receiving the control signal.

In one embodiment, a tangible and non-transitory computer readable media is configured to control one or more processors to obtain phase break location information indicating a location of a phase break along a route to be traversed by a vehicle, wherein the phase break location information is obtained before the vehicle arrives at the phase break; obtain, via one or more vehicle location detectors, vehicle location information indicating at least one of location of the vehicle or movement of the vehicle; and determine an estimated arrival time of the vehicle at the phase break using the phase brake location information and the vehicle location information; and send a phase break control signal to a control system of the vehicle responsive to the estimated arrival time satisfying a threshold.

Optionally, the tangible and non-transitory computer readable media is configured to control the one or more processors to obtain the phase break location information from an office system disposed off-board the vehicle responsive to a change in territory of the vehicle.

Optionally, the tangible and non-transitory computer readable media is configured to control the one or more processors to obtain the location information via a global positioning system (GPS) receiver. For example, in some embodiments, the tangible and non-transitory computer readable media is configured to control the one or more processors to detect locations of the vehicle at different times, and estimate a speed of the vehicle using the locations detected at different times.

Optionally, the control signal is configured to provide an alert to an operator of the vehicle. Alternatively or additionally, in various embodiments, the control signal is configured to autonomously control the vehicle to perform one or more phase break preparation activities.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a phase break input unit configured to obtain phase break location information indicating a location of a phase break along a route to be traversed by a vehicle, wherein the phase break location information is obtained before the vehicle arrives at the phase break;
   one or more vehicle location detectors configured to obtain vehicle location information indicating at least one of location of the vehicle or movement of the vehicle; and
   one or more processors configured to:
      determine an estimated arrival time of the vehicle at the phase break using the phase break location information obtained by the phase break input unit and the vehicle location information obtained by the one or more vehicle location detectors;
      send a phase break control signal to a control system of the vehicle responsive to the estimated arrival time satisfying a threshold; and
      engage dynamic braking as a temporary power source for the vehicle based at least in part on the phase break control signal.

2. The system of claim 1, wherein the phase break input unit and the one or more vehicle location detectors are configured to be disposed on the vehicle.

3. The system of claim 2, wherein the phase break input unit obtains the phase break location information from an office system disposed off-board the vehicle responsive to a change in territory of the vehicle.

4. The system of claim 1, wherein the one or more vehicle location detectors include a global positioning system (GPS) receiver.

5. The system of claim 1, wherein the one or more vehicle location detectors include a receiver configured to receive switch information from a wayside device disposed along the route.

6. The system of claim 1, wherein the control signal is configured to provide an alert to an operator of the vehicle.

7. The system of claim 1, wherein the control signal is configured to autonomously control the vehicle to perform one or more phase break preparation activities.

8. The system of claim 1, wherein the phase break input unit obtains the phase break location information from an office system disposed off-board the vehicle responsive to a change in territory of the vehicle, and the control signal is configured to autonomously control the vehicle to perform one or more phase break preparation activities.

9. A method comprising:
   obtaining phase break location information indicating a location of a phase break along a route to be traversed by a vehicle, wherein the phase break location information is obtained before the vehicle arrives at the phase break;

obtaining, via one or more vehicle location detectors, vehicle location information indicating at least one of location of the vehicle or movement of the vehicle;

determining an estimated arrival time of the vehicle at the phase break using the phase break location information and the vehicle location information;

sending a phase break control signal to a control system of the vehicle responsive to the estimated arrival time satisfying a threshold; and engaging dynamic braking to provide temporary power to the vehicle based at least in part on the phase break control signal.

10. The method of claim 9, further comprising obtaining the phase break location information from an office system disposed off-board the vehicle responsive to a change in territory of the vehicle.

11. The method of claim 9, further comprising obtaining the location information via a global positioning system (GPS) receiver.

12. The method of claim 11, further comprising detecting locations of the vehicle at different times, and estimating a speed of the vehicle using the locations detected at different times.

13. The method of claim 9, further comprising receiving switch information from a wayside device disposed along the route, and determining the location of the vehicle using the switch information.

14. The method of claim 9, further comprising receiving the control signal on-board the vehicle, and providing an alert to an operator of the vehicle responsive to receiving the control signal.

15. The method of claim 9, further comprising receiving the control signal on-board the vehicle, and autonomously controlling the vehicle to perform one or more phase break preparation activities responsive to receiving the control signal.

16. A tangible and non-transitory computer readable media configured to control one or more processors to:

obtain phase break location information indicating a location of a phase break along a route to be traversed by a vehicle, wherein the phase break location information is obtained before the vehicle arrives at the phase break;

obtain, via one or more vehicle location detectors, vehicle location information indicating at least one of location of the vehicle or movement of the vehicle;

determine an estimated arrival time of the vehicle at the phase break using the phase break location information and the vehicle location information;

send a phase break control signal to a control system of the vehicle responsive to the estimated arrival time satisfying a threshold; and engage dynamic braking to provide temporary power to the vehicle based at least in part on the phase break control signal.

17. The tangible and non-transitory computer readable media of claim 16, wherein the tangible and non-transitory computer readable media is configured to control the one or more processors to obtain the phase break location information from an office system disposed off-board the vehicle responsive to a change in territory of the vehicle.

18. The tangible and non-transitory computer readable media of claim 16, wherein the tangible and non-transitory computer readable media is configured to control the one or more processors to obtain the location information via a global positioning system (GPS) receiver.

19. The tangible and non-transitory computer readable media of claim 18, wherein the tangible and non-transitory computer readable media is configured to control the one or more processors to detect locations of the vehicle at different times, and estimate a speed of the vehicle using the locations detected at different times.

20. The tangible and non-transitory computer readable media of claim 16, wherein the control signal is configured to at least one of provide an alert to an operator of the vehicle or autonomously control the vehicle to perform one or more phase break preparation activities.

* * * * *